United States Patent
Blazic et al.

(10) Patent No.: US 7,155,324 B2
(45) Date of Patent: Dec. 26, 2006

(54) APPARATUS AND METHOD FOR PROGRAMMING MOTOR VEHICLE ELECTRONIC CONTROL UNITS

(75) Inventors: Erik L. Blazic, Novi, MI (US); William O. F. Stiles, Jr., Farmington Hills, MI (US); Alan D. Wist, Macomb, MI (US); Marc C Diliddo, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/739,793

(22) Filed: Dec. 18, 2003

(65) Prior Publication Data

US 2004/0254689 A1    Dec. 16, 2004

Related U.S. Application Data

(60) Provisional application No. 60/477,660, filed on Jun. 10, 2003.

(51) Int. Cl.
*G06F 7/00* (2006.01)
(52) U.S. Cl. .................................... 701/36
(58) Field of Classification Search .......... 701/1, 701/29, 31–33, 35–36, 66
See application file for complete search history.

(56) References Cited

U.S. PATENT DOCUMENTS

| | | | |
|---|---|---|---|
| 5,983,087 A * | 11/1999 | Milne et al. | 455/149 |
| 6,694,235 B1 * | 2/2004 | Akiyama | 701/33 |
| 6,795,754 B1 * | 9/2004 | Sunami et al. | 701/1 |
| 6,917,890 B1 * | 7/2005 | Davis et al. | 702/85 |
| 2004/0002793 A1 * | 1/2004 | Tachibana et al. | 701/1 |
| 2004/0204069 A1 * | 10/2004 | Cui et al. | 455/557 |

FOREIGN PATENT DOCUMENTS

EP    1 024 059 A1 * 10/1998

* cited by examiner

*Primary Examiner*—Thu V. Nguyen
(74) *Attorney, Agent, or Firm*—Laura C. Hargitt

(57) ABSTRACT

Methods and apparatuses are provided for programming a plurality of Electronic Central Units (ECUs) for controlling devices in a motor vehicle. A host module positioned within the vehicle is coupled to each of the ECUs. The host module stores the software programs to be downloaded to the ECUs. A software down load enabler included in the host module is responsive to a radio frequency control signal to cause the host module to download the software programs the ECUs. A software down load initiator is located external to the vehicle. The software down load initiator is selectively coupled to the software down load enabler. The software down load initiator provides the control signal to initiate the download of the software programs from the host module to each ECU so that each ECU can control the functioning of a device connected thereto.

21 Claims, 6 Drawing Sheets

APPARATUS AND METHOD FOR PROGRAMMING MOTOR VEHICLE ELECTRONIC CONTROL UNITS

PRIORITY DATA

This application claims priority to U.S. Provisional Patent Application Ser. No. 60/477,660 filed on Jun. 10, 2003.

TECHNICAL FIELD

The present invention relates generally to wireless systems and methods, and more specifically to such systems and methods for programming electronic control units or modules utilized to control the functioning of various hardware devices in motor vehicles.

BACKGROUND

Modern motor vehicles provide many software-controlled features or functions to accommodate the needs and desires of drivers and passengers and to comply with the regulations of governmental agencies. Higher end automobiles, sport utility vehicles and trucks tend to provide an increasing number of such features to accommodate the occupants. Such features are generally controlled by software programmed into various modules or Electronic Control Units (ECUs) located at different places within the vehicle. Such ECUs and the signal paths to and from such ECUs and the hardware devices they control can be thought of as forming a high-speed computer network that is included within the vehicle.

Specifically, many of the major systems in modern vehicles include ECUs that have memories for storing various types of software including algorithms for controlling the functioning of the hardware devices. For example, the internal combustion engines of such vehicles include ECUs that are controlled by such software for adjusting the fuel delivery by the fuel injectors and the spark timing for the spark plugs located in each of the cylinders. The Body Control Modules (BCMs) of such vehicles include an ECU that controls an entry light for lighting the entry or exit when a door is opened. This software controlled ECU also dims the light when the door is closed. The Anti-Lock Braking System (ABS) of a vehicle includes an ECU that is controlled by software to vary the braking action of the brakes of the vehicle depending on variables such as the speed, the weight and the chassis of the vehicle. Even some automotive radios have software controlled ECUs, which increases or decreases the volume of the radio as the vehicle speed is respectively increased or decreased. Many other such software operated ECUs may be utilized in modern vehicles.

In the past the automotive ECU suppliers downloaded the required software into the various ECUs at the ECU manufacturing plants. The manufacturer of the vehicles then installed these preprogrammed ECUs into the vehicles. The foregoing approach was satisfactory when vehicles required less software than they now require. Presently a buyer ordering a modem pickup truck faces a multitude of choices. For instance, the buyer can choose between either several gas engines of various configurations and horsepower or a diesel engine, two or four wheel drive, different axle ratios, and a multitude of other options. Such choices also differ depending on whether the vehicle is for the U.S. or for the export markets. The ECUs in such vehicles are programmed to provide the operating characteristics or parameters that are consistent with the choices made by the buyers. The possible combinations of such programmed parameters have now grown to the hundreds and perhaps to the thousands or more for a full line of vehicles. Also option changes now occur more frequently than in the past making it more difficult for the ECU manufacturers to keep the software up to date.

Because of the large amount of software, the many variations thereof and the changing nature of the software it has already become burdensome for the ECU manufacturers to preprogram some of the ECUs for many vehicles. Thus, some ECU suppliers now provide the vehicle manufacturer with generic non-programmed ECUs, which are later programmed with the vehicle unique software by the vehicle manufacturer. More specifically, after all of the ECUs and the battery are installed in a vehicle, ruggedized computers are utilized by operators in the vehicle manufacturing plant to download the software directly into the memories of each ECU. The computers control the sequential download of each software file or program for one ECU at a time. The internal high-speed network of the vehicle distributes the software to the appropriate ECU. This approach however uses an undesirable amount of resources to complete the downloads. For instance it takes operators a significant amount of time to complete this task. In addition, an undesirably high number of expensive spaces in the final assembly line are allocated to this procedure, which tends to increase the vehicle production cycle time and decrease plant efficiency.

The future trend in vehicle manufacture is to use the same hardware systems for many vehicle types and modify the characteristics of such systems to conform to each vehicle type by modifying the software of the ECUs controlling such systems. As automotive vehicles evolve more electrically enabled functions are used to accommodate increasing customer desires and government regulations. These trends are forecasted to result in the rapid growth of the number of such ECUs and the number of programs used by the ECUs. This increase in the number of ECUs and the amount of software that the vehicle manufacturer arranges to program will exacerbate the aforementioned problems. For instance, the aforementioned prior art solution currently being employed will undesirably have the vehicle manufacturer procure more ruggedized computers and allocate more personnel and more valuable assembly line programming spaces on the already fully utilized final assembly lines.

In view of the foregoing, it should be appreciated that there is a need to provide improved methods and apparatuses for programming the ECUs in vehicles in the vehicle manufacturing plant. It is desired that such methods and apparatuses increase plant efficiency and reduce product production cycle time. It is also desirable for the programming of the required ECU software to be accomplished in an inexpensive, efficient and expeditious manner. It is further desired that such methods and apparatuses minimize the additional amount of resources for performing the programming tasks such as tooling, computing, assembly line space, assembly line expense, the number of personnel and the amount of personnel time. Furthermore, other desirable features and characteristics of the present invention will become apparent from the subsequent brief summary, detailed description, appended claims, and abstract, taken in conjunction with the accompanying drawings and the foregoing technical field and background.

BRIEF SUMMARY

In accordance with an exemplary embodiment of the present invention, an apparatus is provided for programming the memories of a plurality of electronic control units of a vehicle. The apparatus includes a host module positioned within each vehicle. Such host module includes a memory that is loaded with at least one software program and a software down load enabler. Moreover, the apparatus further includes a software down load initiator that provides a control signal to the software down load enabler to initiate the download of the software program from the memory of the host module to the memory of each electronic control unit. This downloaded software program enables each electronic control unit to control the functioning of a vehicle device connected thereto.

In accordance with another exemplary embodiment of the present invention, a method is provided for programming the plurality of electronic control units of a vehicle. The method comprises the steps of providing a host module and coupling the host module to each of the electronic control units. Other steps are to include a memory for storing software programs and a software down load enabler in the host module. The software down load enabler is arranged to be responsive to a control signal to cause the host module to download at least one of the software programs from a memory thereof to a memory of each of the electronic control units. Further steps are to provide a software down load initiator and to selectively couple the software down load initiator to the software down load enabler to initiate the down load of the software program. The software down load initiator is arranged to provide the control signal to the down load enabler. This signal initiates the download of the software programs from the memory of the host module to the memory of each electronic control unit so that each electronic control unit can control the functioning of a device connected thereto

BRIEF DESCRIPTION OF THE DRAWINGS

The present invention will hereinafter be described in conjunction with the appended drawing figures, wherein like reference numbers denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
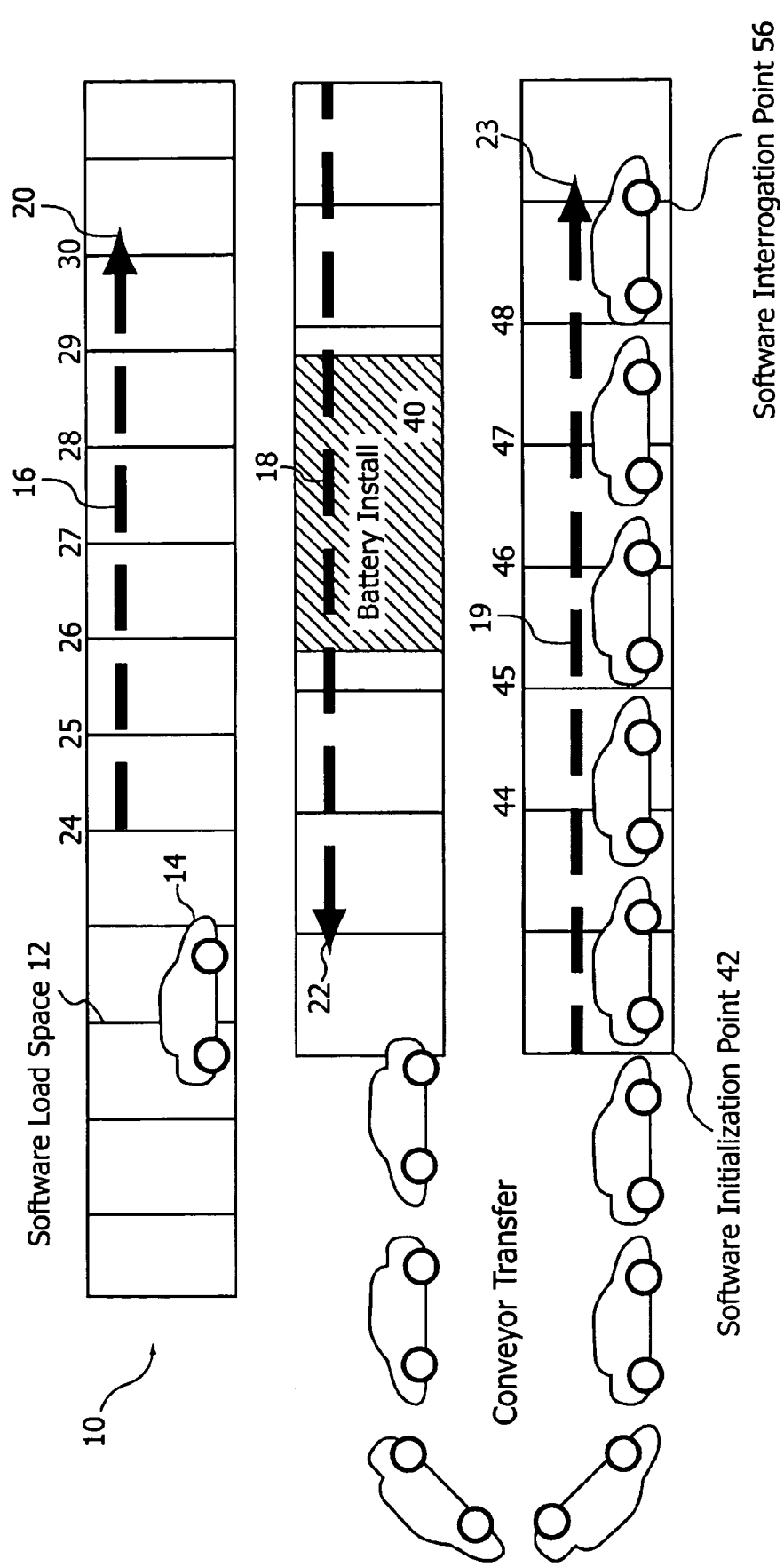
FIG. 1 is a diagrammatic view of an assembly line having apparatuses arranged to perform a software programming method for the ECUs of a vehicle.

Referring to FIG. 1, a diagrammatic view is shown of a vehicle assembly line 10 of an automotive vehicle assembly plant. Line 10 has a number of work spaces such as physical space 12 each arranged to facilitate the performance of assigned tasks or steps related to the manufacture of a vehicle, such as vehicle 14, which can be an automobile, truck or sports utility vehicle, for instance. Each space has a cost of operation, which is a function of the cost of the equipment utilized in the space and other factors. Dashed line 16 and arrowhead 20 indicate the direction of the workflow through other assembly line physical spaces 24 through 30 where the performance of other manufacturing steps is accomplished, for instance. Dashed lines 18 and 19 and respective arrowheads 22 and 23 indicate the direction of the workflow through still other assembly line spaces.

Some of the manufacturing steps include the performance of a software programming method for the ECUs of vehicles, such as vehicle 14, in accordance with an exemplary embodiment of the present invention. As will subsequently be described in more detail with respect to FIG. 2, software is loaded at Software Load Station space 12 into Radio Frequency (RF) enabled software host modules, which are then installed in each vehicle, such as vehicle 14. After the performance of other prerequisite manufacturing steps, a battery is eventually installed in each vehicle in manufacturing line space 40. A software program is then downloaded from the host module to the ECUs as shown in FIG. 3 of each vehicle in response to a RF initializing signal. This signal is provided by an Initialization Station at point 42 of assembly line 10 as will subsequently be described in more detail with respect to FIG. 4. Each ECU is coupled to at least one device within the vehicle to control the functioning of that device in response to a software program or file. After more manufacturing steps are performed in spaces 44 through 48, the results of the software program downloads to the ECUs is monitored at a Software Interrogation Station located at point 56 of assembly line 10 as will subsequently be described in more detail with respect to FIG. 5.

Figure 2:
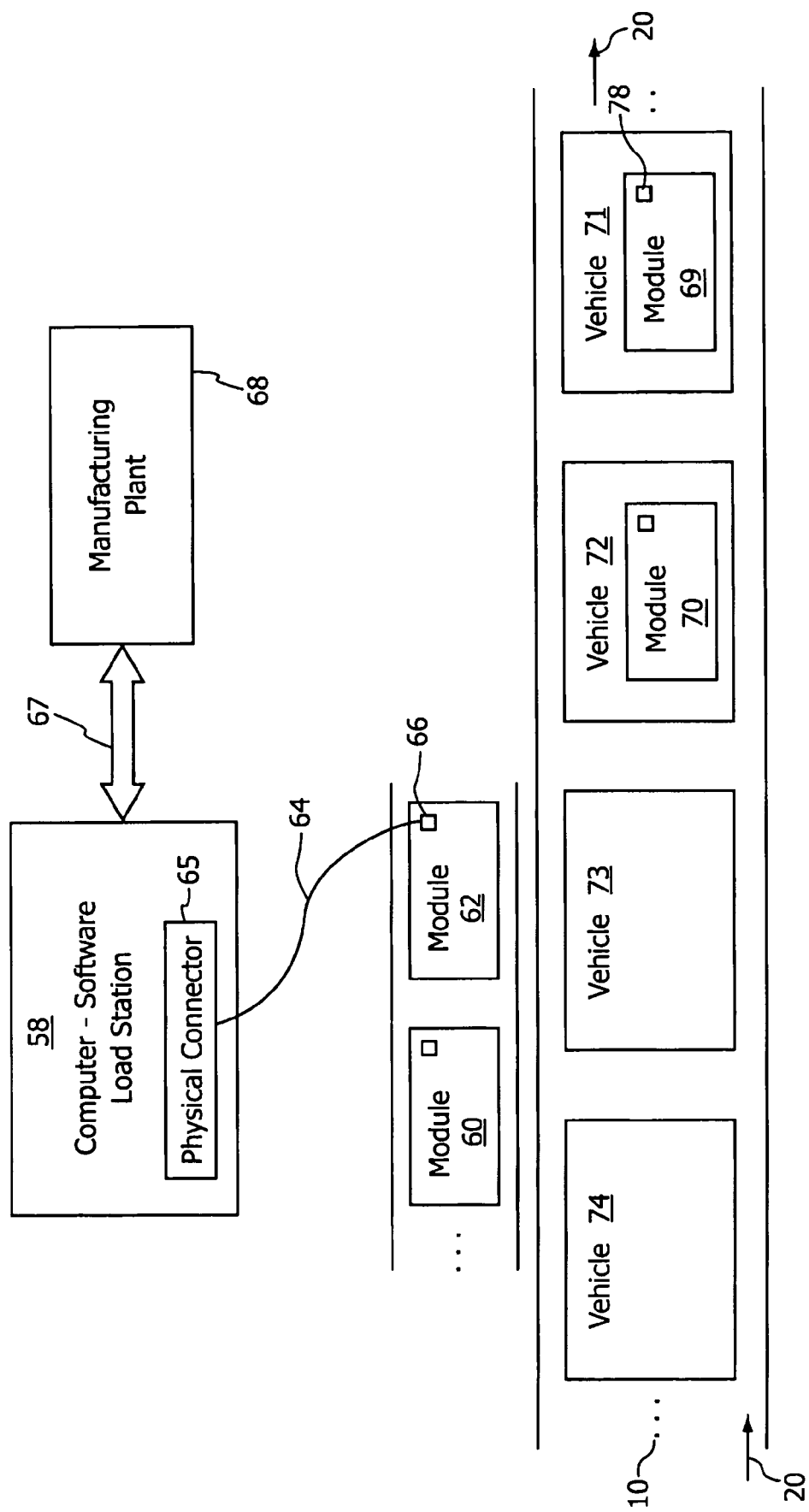
FIG. 2 is a block diagram depicting an assembly line station that loads software programs into wireless software host modules that are then installed in vehicles.
Figure 3:
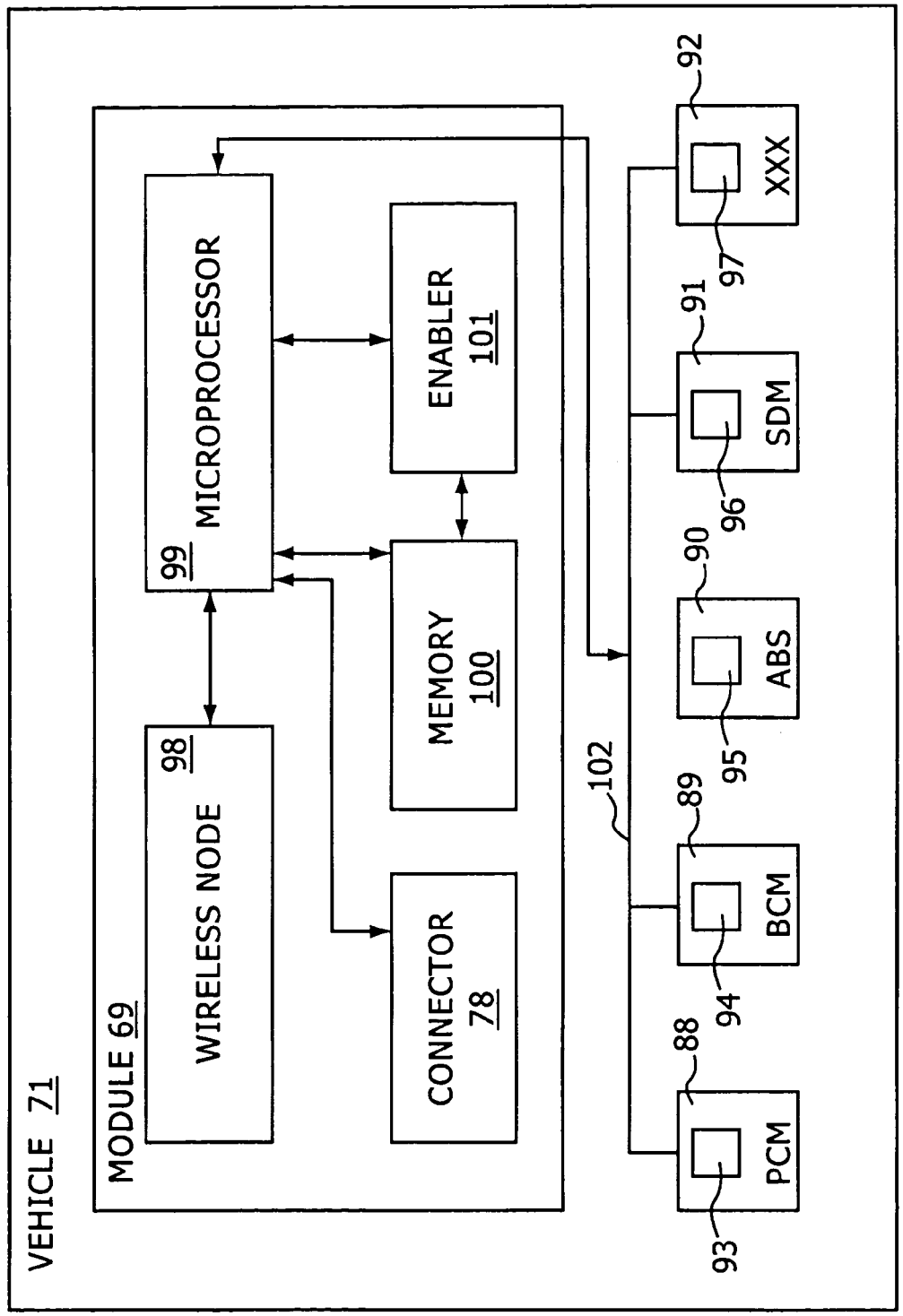
FIG. 3 is a block diagram showing a host module and the connection thereof to various ECUs of a vehicle.

FIG. 2 shows a block diagram including a Software Load Station apparatus 58 that can include a computer in a ruggedized case. Station 58 is located external to the software program host modules represented by blocks 60 and 62. The host modules can be physically identical to each other and each module can have the structure described with respect to FIG. 3. Also, each host module stores at least one software program that controls the functioning of at least one of the ECUs shown in FIG. 3. In practice, several software programs and calibrations that can be unique to the ECUs of an associated vehicle are identified by the plant scheduling system and loaded by known flash or other memory programming techniques into EEPROMs or other nonvolatile memories of host modules 60 and 62 by station 58. This software loading can be quickly accomplished through a high bandwidth Ethernet or fire wire cable 64, which provides a physical connection between a connector 65 of station 58 and a connector on each of the host modules, such as connector 66 on module 62. Connectors 65 and 66 can be Universal Serial Bus (USB) connectors. Other types of connections, cables and/or connectors can be utilized to perform this function as is known in the art. Station 58 is also connected by a two way communication path 67 to the plant infrastructure mainframe computers indicated by block 68 which include scheduling, test and reporting systems.

Each wireless control node of a host module has a unique address or identifier that is read and communicated to plant 68 to arrange the scheduling and content for each download.

Host modules, such as modules 69 and 70, are shown as being disconnected from cable 64 after the software programs are loaded therein. Modules 69 and 70 have been installed in vehicles represented by respective blocks 71 and 72. Each vehicle progresses along assembly line 10 after the appropriate collections of software programs for the ECUs on the vehicle have been loaded into the host module thereof. Vehicles 73 and 74, which are also progressing along assembly line 10 in the direction of arrow 20, have not yet received host modules, such as modules 60 and 62. The physical connectors, such as connector 78, remain accessible for future purposes on the modules such as module 69.

FIG. 3 is a block diagram showing the connection of a programmed host module, such as module 69 of FIG. 2, through a data bus to various ECUs, which are located at various locations in vehicle 71, for instance. These ECUs include Powertrain Control Module (PCM) 88, Body Control Module (BCM) 89, Antilock Braking System Module (ABS) 90, Supplemental Airbag Deployment Module (SDM) 91 and possibly other ECUs represented by block 92. These ECUs conform to a diagnostic specification for the vehicle they are installed in. ECUs 88 through 92 respectively include nonvolatile memories 93 through 97. Module 69 includes a low cost wireless control node 98 that is connected to microprocessor 99. Physical connector 78 is also connected to microprocessor 99. A memory 100 and a software down load enabler 101 are also connected to microprocessor 99. The software down load enabler 101 can be a software function performed by the microprocessor 99 in a known manner. Nonvolatile memory 100 stores at least one software program for controlling the functioning of at least one of the ECUs 88 through 92 shown in FIG. 3. Memory 100 is connected to each of ECUs 88 through 92 through microprocessor 99, which is connected to ECU data bus 102. Microprocessor 99 controls the functions of memory 100 and facilitates the initiation of software downloads by enabler 101 from memory 100 to the memories of the ECUs.

Figure 4:
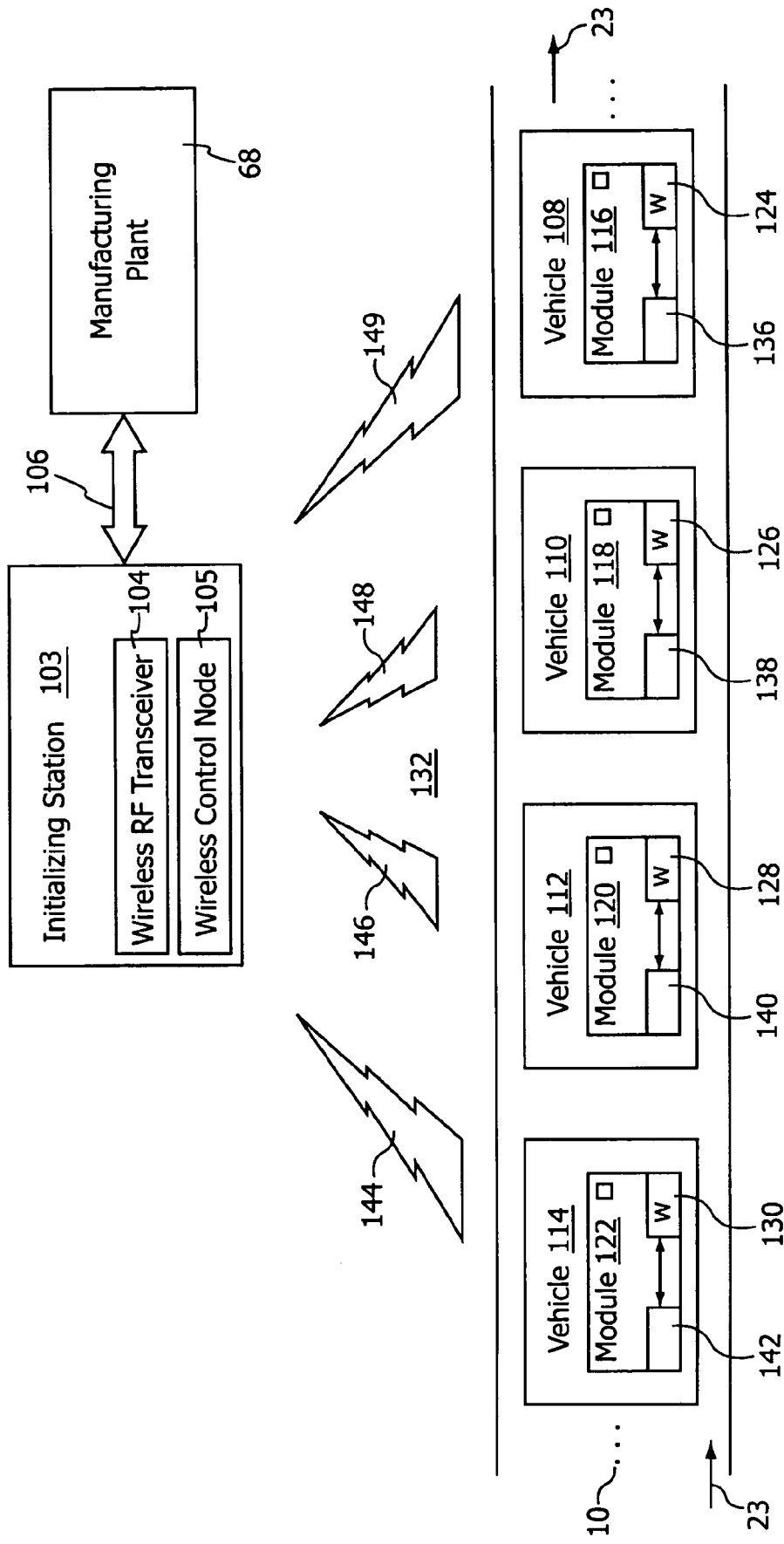
FIG. 4 is a block diagram of another assembly line station that causes the wireless host modules to download the software to program the ECUs.

FIG. 4 shows a Software Download Initializing Station 103 that is located external to the vehicles at assembly line point 42 of FIG. 1. Station 103 has a wireless RF transceiver 104 and a wireless control node 105. Transceiver 104 and node 105 together comprise a software down load initiator for providing control signals to a down load enabler, such as enabler 101 of FIG. 3, to initiate the download of software programs to the memory of an ECU. Flash or other known programming methodologies can be used to accomplish the download. The two-way signal path 106 couples station 103 to the plant infra structure 68, which has been described with respect to FIG. 2. The electrical systems of vehicles 108 through 114 are assembled and the batteries of these vehicles have been installed. Vehicles 108 through 114 respectively include host modules 116 through 122 having respective wireless control nodes 124 through 130. All of the wireless control nodes of FIG. 4 can be selectively coupled to each other and thereby temporarily included in a wireless network 132 of a known type such as a Bluetooth RF wireless network. A wireless standard or protocol other than the well-known Bluetooth protocol could be used to implement network 132. Each vehicle can be identified by the in plant tracking system through the use of a bar code, for instance.

RF signals are transmitted through network 132 that are suitable for communicating control signals to wireless control modules 124 through 130 to operate software download enablers 136 through 142 of FIG. 4 for instance. Each wireless control node of each host module has a unique address or other identifier that was previously read during the software load step of FIG. 2 and communicated to plant 68 to arrange the scheduling and content for each software load. Each software enabler such as enabler 101 of FIG. 3 responds to a control signal to operate microprocessor 99 to cause or initiate the memory 100 of each host module, such as module 69 of FIG. 3, to download the unique software to the memory of an ECU. Specifically, this software is conducted within host module 69 and through signal coupler or data bus 102 to the individual memories, such as 93 through 97 of the ECUs 88 through 92, for example. Such software can be sequentially flash programmed into the ECU memories, for example. The control signals are sent on wireless links 144, 146, 148 and 149 of FIG. 4. These transmissions are primarily short in duration and one-way except for the usual "handshakes" (e.g., Bluetooth RF "handshakes"). Thus, the wireless initiation signal is relatively immune from the RF noise of the factory environment. Hence, the actual software program downloading occurs within each vehicle from the host module to the ECUs thereof.

Figure 5:
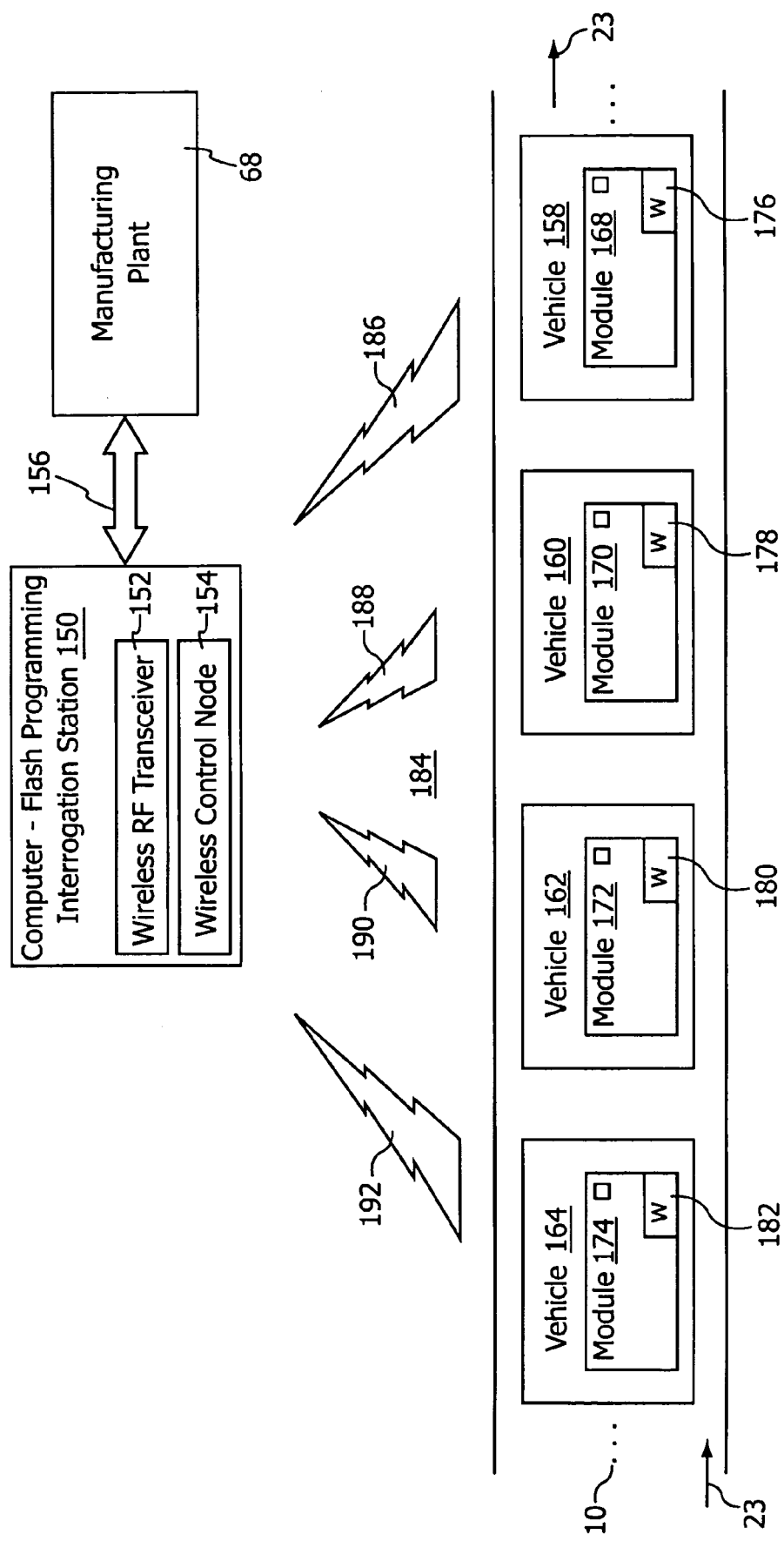
FIG. 5 is a block diagram showing a further assembly line station for interrogating the wireless software host modules to determine the programming statuses of each of the ECUs.

FIG. 5 shows a Software Program Interrogation Station 150 that is located at assembly line point 56 of FIG. 1. Station 150 has a wireless RF transceiver 152 and a wireless control node 154. Two-way signal path 156 couples station 150 to the plant infrastructure 68, which has been described with respect to FIG. 2. Vehicles 158 through 164 respectively include host modules 168 through 174 having respective wireless control nodes 176 through 182. The wireless control nodes of FIG. 5 can be selectively included in a RF wireless network 184 of a known type (e.g., Bluetooth RF wireless network). Station 150 temporarily links through network 184 to each of host module nodes 176 through 182. If each host module node has not already addressed its associated host memory, the host module addresses the associated memory of the host module to determine the statuses of the software downloaded to the ECUs and to read and store any error codes. Signals are transmitted through the two way communication links 186, 188, 190 and 192 of network 184, which is suitable for interrogating the modules 168 through 174 to determine the statuses of the software programs programmed into ECUs connected thereto. Each vehicle is again automatically identified by the in plant tracking system or a bar code, for instance. The RF address (e.g., Bluetooth RF address) can then be retrieved so that the module can send the programming statuses and other types of information obtained from an ECU in the vehicle, such as diagnostic trouble codes to the interrogation station 150 by RF. This information is then sent on path 156 to plant 68. If there are problems, a repair mode is entered, which might result in a repairperson being dispatched to repair the vehicle. Such host modules 168 through 174 can be used to record and provide diagnostic information throughout the life of the vehicles including such modules. Connections can be made to these modules through the RF nodes and/or the physical connectors thereof.

Figure 6:
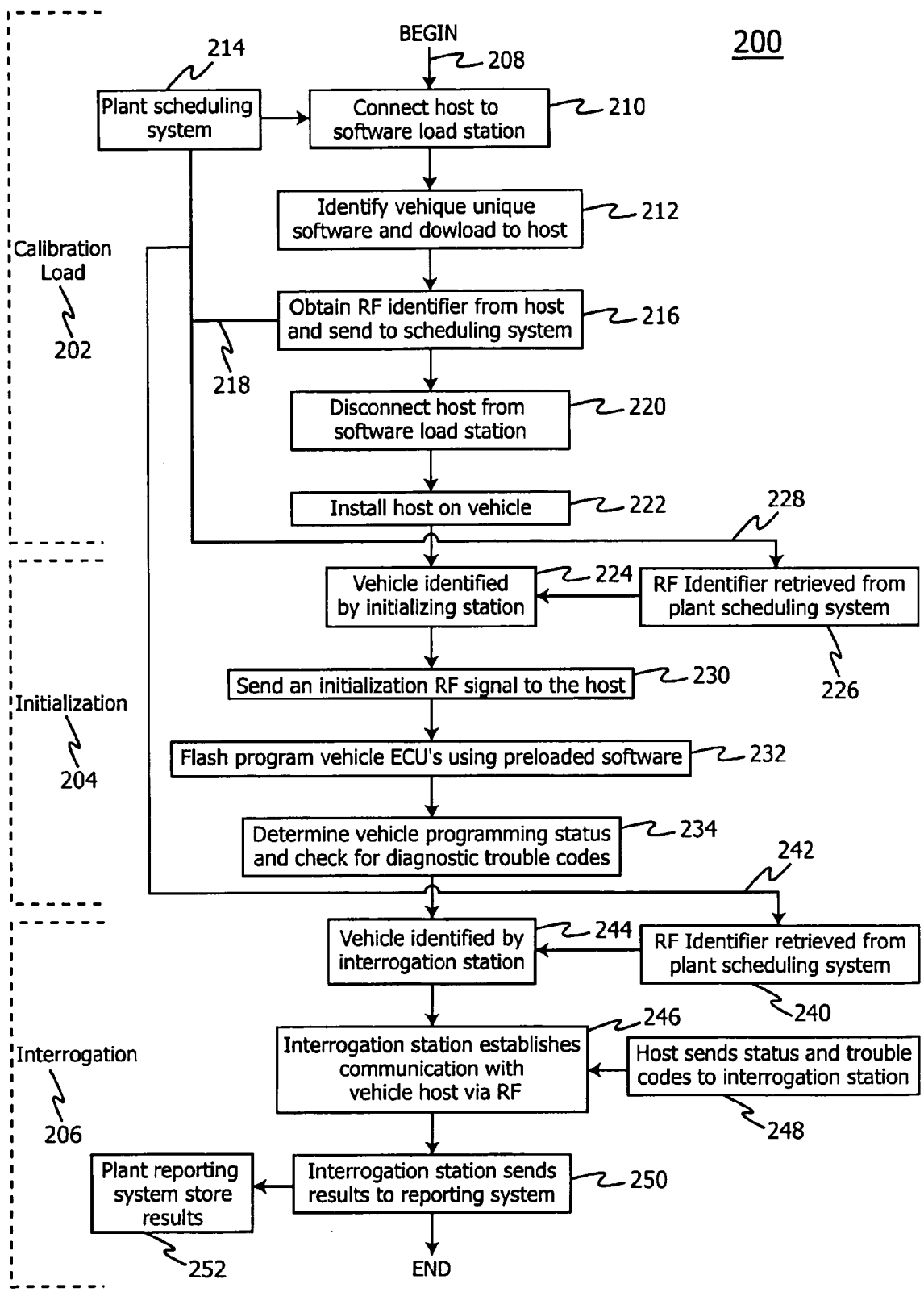
FIG. 6 is a flow chart of the programming method of an embodiment of the invention that is implemented by the apparatuses of the aforementioned FIG. 1 through FIG. 5.

FIG. 6 shows a method 200 for programming the plurality of electronic control units, such as the ECUs 88 through 92 of vehicle 71 of FIG. 3. Each ECU, such as the ECU included in ABS 90, is coupled to at least one hardware device, such as the brakes of vehicle 71. Such ECU is adapted to control the functioning of the device connected thereto in response to a software program stored in the memory thereof, such as memory 95. Method 200 generally includes three main functions. The first main function is Calibration and Software Load 202, the second main function is Software Download Initialization 204 and the third main function is Interrogation 206. Stations 58, 103 and 150 of respective FIGS. 2, 4, and 5 can perform these main functions as previously described.

Referring again to FIG. 6, the Calibration and Software Load function 202 begins 208 with the step 210 of physically connecting a host module, such as module 62, to a software load station, such as station 58 as shown in FIG. 2. The next steps of block 212 of FIG. 6 are to utilize the scheduling system 214 of a plant, such as plant 68 of FIG. 2, to identify the vehicles unique software and download the software programs to the memory of a host module such as module 62. Next, the steps of obtaining the unique RF identifier are performed from the wireless node, such as node 98, of the host module, such as 69 of FIG. 3, and sending this identifier to the plant scheduling system 214 as indicated by line 218. The following step 220 is to disconnect the host module 62 from the software load station 58. Then the host module 69 is positioned and installed in step 222 in a vehicle 71 so that module 69 is thereby connected to the ECUs of the vehicle as shown in FIG. 3.

The Software Download Initialization function 204 begins with the step 224 of identification of the vehicle by the Initializing Station 103 of FIG. 4. This step includes retrieval of the RF identifier 226 stored in step 216 from system 214 as indicated by line 228. Next the software down load initiator of station 103 is selectively coupled to a software down load enabler 101 of FIG. 3 so that an RF initialization or control signal is sent per step 230 to the wireless node of the host module by the initiator. Then the software down load enabler 101 responds to the control signal to download or flash program per step 232 at least one of the preloaded software programs from the memory 100 of the module to the memories of each of the ECUs of FIG. 3, for example. The final steps of function 204 are for the host module to determine the programming statuses of the ECUs of the vehicle and to check for diagnostic trouble codes per method block 234. These statuses and codes can be stored in the memory of the module such as memory 100 of module 69 of FIG. 3.

The Software Status Interrogation function 206 begins with the retrieval 240 by Interrogation Station 150 of FIG. 5 of a vehicle RF identifier from plant scheduling system 214 as indicted by line 242. Next this identifier is used by the interrogation station (e.g., 150 of FIG. 5) to identify the vehicle (e.g., vehicle 158 per step 244). The interrogation station 150 then establishes communication per step 246 with the vehicle using RF links, such as link 186. The host module of the vehicle (e.g., module 168) then sends the programming statuses and any trouble codes per step 248 to the interrogation station. The interrogation station 150 then sends the programming status per step 250 and any diagnostic trouble codes to the plant reporting system, which stores this data for future use per step 252.

In view of the foregoing, it should be appreciated that there have been provided improved methods 200 of FIG. 6 and apparatuses 58, 103 and 150 of respective FIGS. 2, 4, and 5. These methods and apparatuses program the ECUs, such as 88 through 92 of FIG. 3, in vehicles being manufactured on an assembly line 10 in a vehicle manufacturing plant. Such automated methods and apparatuses increase plant efficiency and reduce product production cycle time. The programming of the required ECU software is accomplished in an inexpensive, efficient and expeditious manner. Such automated methods and apparatuses minimize the additional amount of resources such as tooling, computing, assembly line space, the number of personnel and personnel time required for performing the ECU programming tasks. The main functions of method 200 include Calibration and Software Load 202, Software Download Initialization 204 and Interrogation 206 of FIG. 6. Stations 58, 103 and 150 which perform these main functions as previously described can be located at unconventional, lower cost plant assembly line spaces or other places such as conveyor or transfer zones, molding install stations, etc.

While the exemplary embodiments have been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description provides those skilled in the art with a convenient road map for implementing an exemplary embodiment of the invention. It being understood that various changes may be made in the function and arrangement of elements described in any exemplary embodiment without departing from the spirit and scope of the invention as set forth in the appended claims.

What is claimed is:

1. An apparatus for programming a plurality of non-programmed generic electronic control units of a vehicle, each non-programmed generic electronic control unit being coupled to at least one device within the vehicle, and, after programming, each programmed electronic control unit being adapted to control the functioning of the device connected thereto in response to a software program stored in a memory of the programmed electronic control unit, the apparatus comprising:

a host module positioned within the vehicle, said host module being coupled to each of the non-programmed generic electronic control units, and said host module including a memory that stores software programs to be downloaded for controlling the functioning of the devices;

a software down load enabler included in said host module, said software down load enabler being coupled to said memory of said host module, and said software down load enabler being responsive to an externally generated control signal to cause said host module to download at least one of said software programs from said memory thereof so that the program can be stored in the memory of at least one of the non-programmed generic electronic control units; and a software down load initiator located external to the vehicle and selectively coupled to said software down load enabler, said software down load initiator providing said externally generated control signal to said down load enabler to initiate said download of said software program from said memory of said host module to the memory of each non-programmed generic electronic control unit so that each programmed electronic control unit can control the functioning of the device connected thereto.

2. The apparatus of claim 1 further including:

a software load station located external to the vehicle; and a connector adapted to connect said software load station to said host module so that the software programs for controlling the functions of the devices can be loaded from said software load station into said memory of said host module; and said connector being adapted to be disconnected from said host module after said software programs are loaded into said host module.

3. The apparatus of claim 1 further including an interrogation station, said interrogation station being temporarily coupled to receive information obtained from said memories of each of said programmed electronic control units to ascertain the statuses of said downloaded software programs.

4. The apparatus of claim 1 wherein:
a first wireless control node being included in said software down load initiator and
a second wireless control node being included in said host module, said second wireless control node being coupled to said software down load enabler included in said host module, said first wireless control node being adapted to provide a radio frequency signal for communicating said externally generated control signal to said second wireless control node, said second wireless control node being responsive to said externally generated control signal communicated by said radio frequency signal to cause said host module to download said software program from said host module to each of the non-programmed generic electronic control units.

5. The apparatus of claim 4 wherein said first wireless control node and said second wireless control node operate in accordance with a radio frequency wireless standard.

6. The apparatus of claim 1 wherein:
a signal coupler being included in said host module, said signal coupler providing a signal path from said host module to the memories of each of the non-programmed generic electronic control units;
said software down load enabler being responsive to said externally generated control signal to cause said memory of said host module to download said software programs to the memory of each of the non-programmed generic electronic control units; and said software down load initiator being selectively coupled to said software down load enabler, said software down load initiator providing said externally generated control signal to said software down load enabler which results in said memory of said host module downloading said software programs to said memory of each of the non-programmed generic electronic control units.

7. The apparatus of claim 6 wherein said memory of each of said electronic control units is a nonvolatile memory.

8. The apparatus of claim 6 wherein:
a first a wireless control node being included in said software down load initiator; and
a second wireless control node being included in said host module, said second wireless control node being coupled to said software down load enabler;
said first wireless control node being adapted to provide a radio frequency signal for communicating said externally generated control signal to said second wireless control node, said second wireless control node being responsive to said externally generated control signal communicated by said radio frequency signal to cause said memory of said host module to download said software programs to each of the non-programmed generic electronic control units.

9. The apparatus of claim 8 further including an interrogation station, said interrogation station including a third wireless node, said memory of said host module storing information obtained from each of said memories of each of said programmed electronic control units relating to the statuses of said downloaded software programs, said third wireless node being temporarily coupled through said second wireless node of said host module to receive said information stored in said memory of said host module.

10. A method for programming a plurality of non-programmed generic electronic control units of a vehicle, each non-programmed generic electronic control unit being coupled to at least one device within the vehicle, and each programmed electronic control unit being adapted to control the functioning of the device connected thereto in response to a software program stored in a memory thereof, the method comprising the steps of:
providing a host module;
coupling said host module to each of the non-programmed generic electronic control units;
including a memory in said host module for storing software programs for controlling the functioning of the devices;
further including a software down load enabler in said host module;
arranging said software down load enabler to be responsive to an externally generated control signal to cause said host module to download at least one of said software programs from said memory thereof to the memory of each of the non-programmed generic electronic control units;
providing a software down load initiator located external to the vehicle;
selectively coupling said software down load initiator to said software down load enabler when said down load is to be initiated; and
arranging said software down load initiator to provide said externally generated control signal to said down load enabler to initiate said download of said software program to the memory of each non-programmed generic electronic control unit so that each programmed electronic control unit can control the functioning of the device connected thereto.

11. The method of claim 10 further including the steps of:
providing a software load station at a position located external to the vehicle; and
temporarily connecting said software load station to said host module;
loading the software programs for controlling the function of the devices from said software load station into said memory of said host module;
disconnecting said software load station from said host module after said software programs are loaded into said host module; and
installing said host module in a vehicle.

12. The method of claim 11 wherein the step of loading the software programs further includes the steps of:
identifying the unique software to be downloaded to the host module;
providing an identifier for said host module; and
sending said identifier to a scheduling system.

13. The method of claim 10 further including the steps of:
providing an interrogation station at a position external to the vehicle;
coupling said interrogation station to said host module;
arranging said interrogations station to receive status information obtained from said memory of each of said programmed electronic control units; and
de-coupling said interrogation station from said host module.

14. The method of claim 10 further including the steps of:
locating said software download initiator at a position external to the vehicle;
providing a first wireless control node in said software down load initiator;

providing a second wireless control node in said best module;

coupling said second wireless control node to said software down load enabler adapting said first wireless control node to provide a radio frequency signal for communicating said externally generated control signal to said second wireless control node; and arranging said second wireless control node to be responsive to said externally generated control signal to cause said host module to download said software program to each of the non-programmed generic electronic control units.

15. The method of claim 14 wherein said step of arranging said second control node to be responsive to said externally generated control signal to cause said host module to download said software program to each of the non-programmed generic electronic control units, further includes the steps of:

retrieving a vehicle identifier; and programming the memories of the non-programmed generic electronic control units of the vehicle with software from said host module.

16. The method of claim 14 further including the steps of:

determining the statuses of the programs in the programmed electronic control units; and obtaining information relating vehicle diagnostic trouble codes.

17. The method of claim 14 further including a step of operating said first wireless control node and said second wireless control node in accordance wit a Bluetooth commercial RF wireless standard.

18. The method of claim 10 further comprising the steps of:

providing a signal coupler in said host module; and providing a signal path through said signal coupler from said memory of said host module to the memory of each of the non-programmed generic electronic control units so that software can be downloaded through said signal path.

19. The method of claim 10 further comprising the steps of:

selectively positioning said software download initiator external to the vehicle;

including a first a wireless control in said software down load initiator;

further including a second wireless control node in said host module;

coupling said second wireless control node to said software down load enabler;

adapting said first wireless control node to provide a radio frequency signal for communicating said externally generated control signal to said second wireless control node; and arranging said second wireless control node to respond to said externally generated control signal communicated by said radio frequency signal to cause said memory of said host module to download said software programs to each of the non-programmed generic electronic control units.

20. The method of claim 19 comprising the further steps of:

providing an interrogation station external to the vehicle;

including a third wireless node in said interrogation station; and temporarily coupling said third wireless node through said second wireless node of said host module to receive information obtained from each of said memory of each of said programmed electronic control units to communicate the statuses of said downloaded software programs.

21. The method of claim 20 further comprising the step of providing said statuses of said downloaded programs to a reporting system.

* * * * *